Patented Dec. 30, 1952

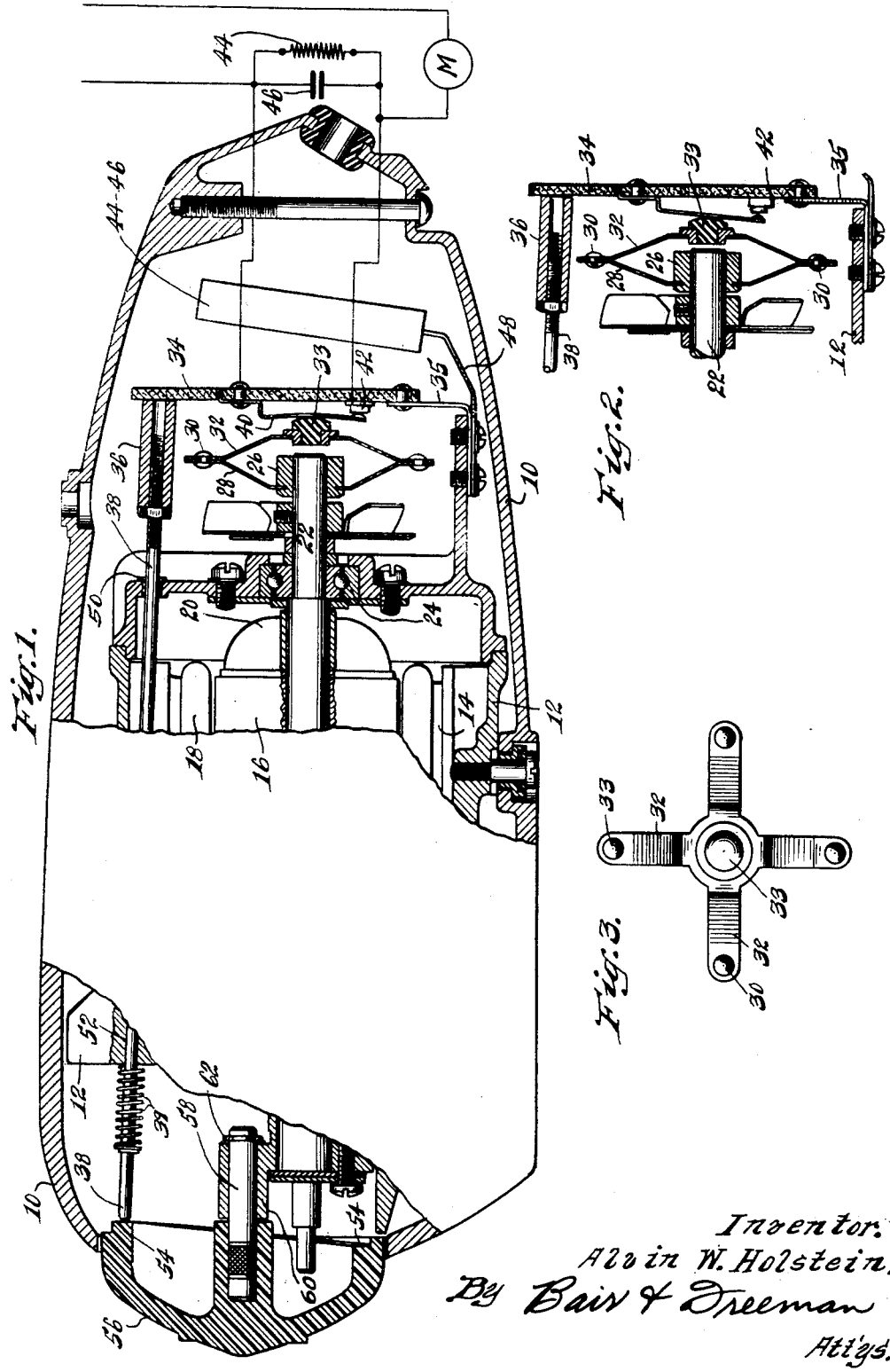

2,623,961

UNITED STATES PATENT OFFICE 2,623,961

SPEED CONTROL FOR MOTORS

Alvin W. Holstein, St. Louis, Mo., assignor to Knapp-Monarch Company, St. Louis, Mo., a corporation of Delaware Application August 13, 1949, Serial No. 110,154

3 Claims. (Cl. 200—80)

This application relates to a speed control for motors such as those of the series-wound fractional horse power type, the controller being particularly adaptable for food mixer motors and motors of other power food processing devices or attachments for food mixers.

One object of the invention is to provide a speed controller or governor which automatically and economically maintains the proper speed on the beater or food mixer shafts and which is adjustable so that the speed can be changed at will. Present devices used to vary the speed of beaters on a food mixer do so by either varying the motor speed with a potentiometer or rheostat, or with a governor to interrupt the electrical circuit. Of the two types, the latter is superior since the motor operates more efficiently on low speed and said latter type has been selected for use in connection with the instant invention.

Some of the conventional speed control governors are elaborate and expensive and a further object of my invention therefore is to provide one which is economical to manufacture, assemble, and adjust and involves but a few parts which cooperate to do an efficient job of controlling the speed of the motor.

Another object is to provide a speed control or governor which may be made in the form of a small unit attached to the end of the motor housing and may occupy the space usually provided for potentiometers or rheostats, preferably at the end of the motor housing rather than increasing the diameter of the housing.

Still a further object is to provide means of transmitting the adjusting motion to a convenient point of access of the front of the motor housing or some such suitable location.

An additional object is to provide a speed control of simple and rugged construction which eliminates the complications of many switches and relays used in other controls and which is readily subject to assembly line calibration.

With these and other objects in view, my invention consists in the construction, arrangement and combination of the various parts of my speed control for motors, whereby the objects contemplated are attained, as hereinafter more fully set forth, pointed out in my claims and illustrated in the accompanying drawings, wherein:

Figure 1 is an elevation partly in section of a motor housing and a motor therein together with my speed control applied to the motor.

Figure 2 is a repetition of a portion of Figure 1 showing the action of the parts when the motor is rotating sufficiently to cause the governor to open the motor switch contacts; and Figure 3 is an end elevation of the centrifugally operated member that operates my control.

On the accompanying drawing I have used the reference numeral 10 to indicate in general a housing such as one used for food mixers. Within the housing 10 a motor frame 12 is provided having the usual stator elements 14, rotor or armature 16, and field and armature windings 18 and 20. The shaft of the motor is illustrated at 22, the left-hand end thereof being suitably connected to beater shafts or the like and the right-hand end extending through a bearing 24 to terminate at a position suitable for connection to my speed control.

My speed control consists of a hub 26 secured to the shaft 22 and having a spider 28 secured to the hub itself. This spider is a multiple arm affair such as illustrated in Figure 3 and is connected by rivets 30 with a second and similar spider 32 which terminates in a button 34 of insulating material.

A contact breaker base 34 of insulating material is supported by a leaf spring 35 and biased by the leaf spring toward the left in Figure 1 to engage a sleeve 36 of an adjusting rod 38. The switch base 34 carries a movable contact 40 and a stationary contact 42 which are normally engaged for establishing the motor circuit shown diagrammatically in Figure 1 wherein the motor is indicated at M. The switch 40—42 according to this circuit is in series with the motor and to cause merely reduction and not opening of the circuit I provide a resistor 44 shunting the switch. I also provide a condenser 46 shunting the switch to minimize arcing of the contacts.

The resistor and the condenser are shown diagrammatically at the right hand end of Figure 1 and are also shown as to position by a rectangle indicated 44—46 which is the position these parts occupy in the rearward end of the housing. The condenser-resistor unit is illustrated as mounted on a leaf spring 48, this space being usually occupied by a potentiometer, rheostat or other types of control device.

The adjusting rod 38 extends through a bushing 50 and through an opening 52 in the motor frame 12 to terminate adjacent a cam track 54 of a control knob 56 rotatably mounted at the front end of the housing 10. By way of example the knob 56 may be molded of bakelite or the like and have a pin 58 extending therefrom to rotate in a hub 60 of the motor frame with a retainer provided at 62 to retain the knob in assembled position.

*Practical operation*

In the operation of my speed control, when the motor is at rest the parts would assume the position shown in Figure 1. As the motor speeds up centrifugal force acts on the arms of the spiders 28 and 32 and on the rivets 30 which serve as centrifugal weights so that the spiders flatten toward each other as shown in Figure 2 and at a predetermined speed will separate the contacts of the switch 40—42 as illustrated whereupon substantially that speed will be maintained with a slight but substantially imperceptible hunting action if the parts are properly designed so that the switch 40—42 acts as a flutter relay.

Obviously the switch base 34 can be swung toward the right and will require greater centrifugal force to separate the contacts so that the cam surface 54 of the control knob 56 either pushes the rod 38 inwardly against the action of the spring 39 for decreasing the speed or permits the spring to push the rod outwardly for increasing the speed.

While I have described the knob 56 as being at the front end of the housing 10, it is obvious that it may be located wherever desirable, the thrust rod 38 serving to transmit the adjusting motion from the knob to the switch base 34 in the desired manner. A change of this suggested type may be made without departing from the real spirit and purpose of my invention, and it is my intention to cover by my claims any modified forms of structure or use of mechanical equivalents which may be reasonably included within their scope.

I claim as my invention:

1. In a speed control for motors, a movable switch base at the end of the motor shaft, a normally open switch mounted thereon, said switch base being biased toward the motor shaft, centrifugally operated spiders carried by the motor shaft and normally causing engagement of the contacts of said switch, said spiders, if broken, permitting said contacts to open, said spiders collapsing in a direction axially of and toward the motor shaft upon increase in speed of the motor, and means for adjusting said switch base comprising a thrust rod against which the base is biased, a knob having a cam engaging said thrust rod, and spring means causing such engagement, rotation of said knob and cam effecting axial movement of said thrust rod and thereby movement of said switch base against the action of its bias.

2. In a speed control for motors, a spring secured to the motor frame, a switch base supported thereby, switch contacts on said base, said contacts being normally open, a thrust rod against which said switch base is biased by said spring, a pair of centrifugally-operated spiders, one carried by the motor shaft and the other carried by the first one and located beyond one end of said motor shaft, said other spider being effective to close said contacts when the motor is stationary and to permit them to open when it is rotating at a predetermined speed or when said spiders are broken, a thrust rod against said switch base, and means for adjusting said thrust rod comprising a rotatable knob having a cam surface, and spring means for engaging said thrust rod with said cam surface.

3. In a speed control for motors, a leaf spring secured to the motor frame, a switch base supported thereby and biased toward one end of the motor shaft, switch contacts on said base, said contacts being normally open, a thrust rod extending from the front end of said motor and engaged by said switch base, a pair of centrifugally-operated spiders carried by the motor shaft with one of the spiders located beyond said end and effective to engage and thereby close said contacts when the motor is stationary and to permit them to open when it is rotating at a predetermined speed, and means for adjusting said thrust rod comprising a rotatable knob at the front of the motor and having a cam surface, and spring means for engaging said thrust rod with said cam surface.

ALVIN W. HOLSTEIN.

REFERENCES CITED

The following references are of record in the file of this patent:

UNITED STATES PATENTS

| Number | Name | Date |
|---|---|---|
| 2,493,897 | Petz | Jan. 10, 1950 |